United States Patent [19]

Deguchi et al.

[11] Patent Number: 5,412,630
[45] Date of Patent: May 2, 1995

[54] TRACKING SYSTEM FOR OPTICAL DISC MEMORY USING TRACKING ERROR SIGNALS FROM MAIN BEAM AND AUXILIARY BEAMS

[75] Inventors: Toshihisa Deguchi; Tetsuya Inui; Kenji Ohta, all of Nara; Shohichi Katoh, Yamatokoriyama, all of Japan

[73] Assignee: Sharp Kabushiki Kaisha, Osaka, Japan

[21] Appl. No.: 289,565

[22] Filed: Aug. 12, 1994

Related U.S. Application Data

[60] Division of Ser. No. 74,147, Jun. 9, 1993, which is a continuation of Ser. No. 804,639, Dec. 11, 1991, abandoned, which is a continuation of Ser. No. 569,748, Aug. 21, 1990, abandoned, which is a continuation of Ser. No. 232,850, Aug. 16, 1988, abandoned, which is a division of Ser. No. 911,410, Sep. 25, 1986, Pat. No. 4,787,076.

[30] Foreign Application Priority Data

Sep. 27, 1985 [JP] Japan .................... 60-215695
Oct. 30, 1985 [JP] Japan .................... 60-245095

[51] Int. Cl.⁶ ............................ G11B 7/095
[52] U.S. Cl. ...................... 369/44.32; 369/44.37; 369/44.41
[58] Field of Search ............ 369/44.13, 44.25, 44.26, 369/44.27, 44.29, 44.32, 44.34, 44.35, 44.37, 44.41, 54, 58

[56] References Cited

U.S. PATENT DOCUMENTS

| | | |
|---|---|---|
| 4,344,165 | 8/1982 | Akiyama . |
| 4,358,796 | 11/1982 | Ceshhovsky et al. . |
| 4,512,002 | 4/1985 | Kosaka et al. . |
| 4,539,665 | 9/1985 | Iso et al. . |
| 4,544,838 | 10/1985 | Musha et al. . |
| 4,564,929 | 1/1986 | Yonezawa et al. . |
| 4,581,728 | 4/1986 | Nakamura et al. . |
| 4,627,040 | 12/1986 | Arai et al. . |
| 4,661,942 | 4/1987 | Yoshimoto et al. . |
| 4,663,751 | 5/1987 | Kaku et al. . |
| 4,695,992 | 9/1987 | Aoi . |
| 4,707,816 | 11/1987 | Yonezawa et al. . |
| 4,748,609 | 5/1988 | Yonezawa et al. . |
| 4,751,695 | 6/1988 | Kaku et al. . |

FOREIGN PATENT DOCUMENTS 2062901  5/1981  United Kingdom .

OTHER PUBLICATIONS

Patent Abstracts of Japan, vol. 8, No. 237, (p-310), Oct. 30, 1984, & JP59-112442.
Patent Abstracts of Japan, vol. 8, No. 144, (p-284), Jul. 05, 1984, & JP59-42673.
Patent Abstracts of Japan, vol. 9, No. 243, (p-392), Sep. 30, 1985, & JP60-95736.
Patent Abstracts of Japan, vol. 9, No. 327, (p-415), Dec. 21, 1985, & JP60-151846.

*Primary Examiner*—W. R. Young

[57] ABSTRACT

A tracking system for positioning a light spot onto a magneto optic or optical disc having a beam guide track preformatted thereon comprises a main light beam and two auxiliary light beams, and a circuit for subtracting a low frequency component of a difference between the tracking error signals, detected by the respective auxiliary light beams and the main light beam, from a tracking error signal detected by the main light beam.

2 Claims, 6 Drawing Sheets

Fig. 13 (c) Prior Art ns a Continuation of application Ser. No. 07/804,639 filed on Dec. 11, 1991, abandoned, which is a Continuation of application Ser. No. 07/569,748 filed on Aug. 21, 1990, abandoned, which is a Continuation of application Ser. No. 07/232,850 filed on Aug. 16, 1988, abandoned, which is a Divisional application of application Ser. No. 06/911,410 filed on Sep. 25, 1986, now U.S. Pat. No. 4,787,076, the entire contents of which are hereby incorporated by reference.

TRACKING SYSTEM FOR OPTICAL DISC MEMORY USING TRACKING ERROR SIGNALS FROM MAIN BEAM AND AUXILIARY BEAMS

This application is a divisional of application Ser. No. 08/074,147, filed on Jun. 9 1993 which ms a Continuation of application Ser. No. 07/804,639 filed on Dec. 11, 1991, abandoned, which is a Continuation of application Ser. No. 07/569,748 filed on Aug. 21, 1990, abandoned, which is a Continuation of application Ser. No. 07/232,850 filed on Aug. 16, 1988, abandoned, which is a Divisional application of application Ser. No. 06/911,410 filed on Sep. 25, 1986, now U.S. Pat. No. 4,787,076, the entire contents of which are hereby incorporated by reference.

BACKGROUND OF THE INVENTION

1. Field of Technology

The present invention relates to a tracking system for an optical memory device of a type wherein any of the information recording, reproduction and erasing can be carried out by radiating a laser beam to a memory medium.

2. Description of the Prior Art

Optical memory devices have recently drawn the attention of people as a high density, high capacity memory device. The reason for this optical memory device to be of high density and high capacity is because the size of each bit which represents the unit of information storage capacity can be reduced to a diameter of about 1 μm. This, in turn, however, imposes some limitations on the optical memory device, More specifically, in order for information to be recorded on, or reproduced from, a predetermined location, the light beam is required to be accurately positioned.

Because of the foregoing, when rising a disc capable of accommodating information additionally recorded on a disc capable of recording information simultaneously with erasure of the previously recorded information, it is a general practice for the disc substrate to be permanently provided with beam guide tracks or address information.

Figures 9, 10A:
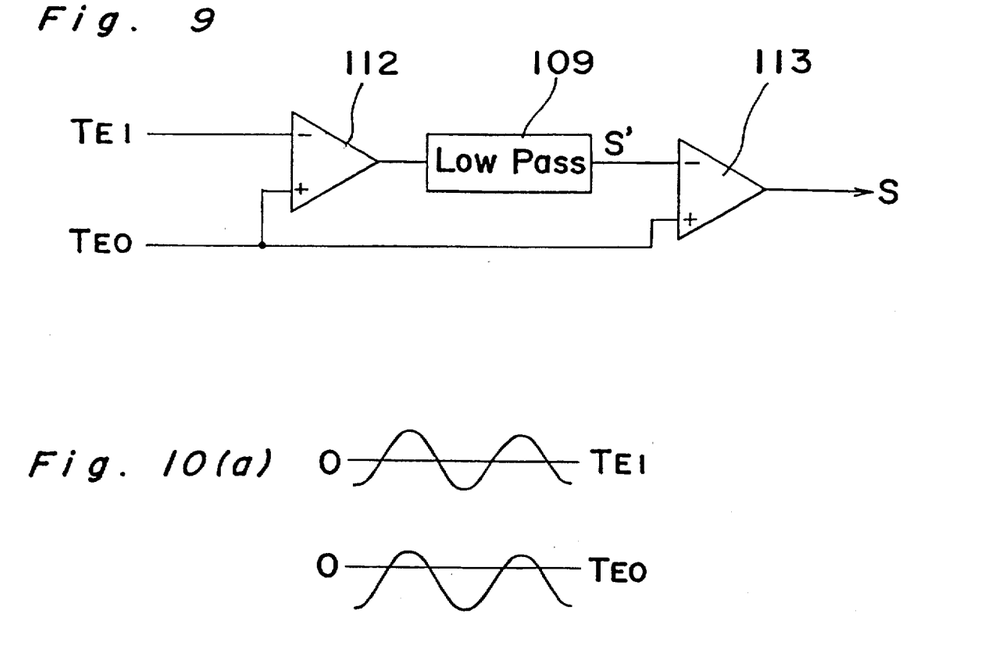
FIG. 9 is a diagram similar to FIG. 7 showing a modified form of the circuit.
FIG. 10(a), 10(b) and 10(c) are is a chart showing waveforms of signals.
Figure 10B:
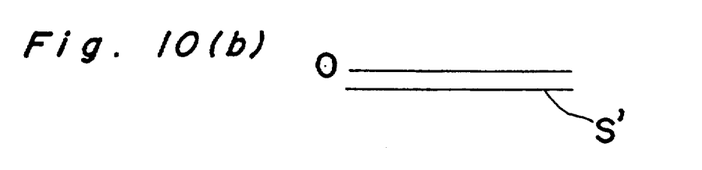
Figure 10C:
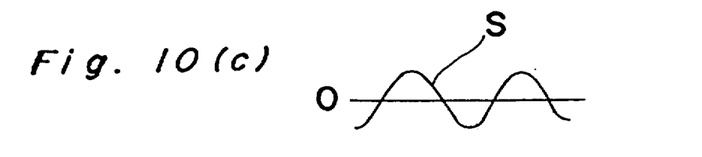
Figure 11:
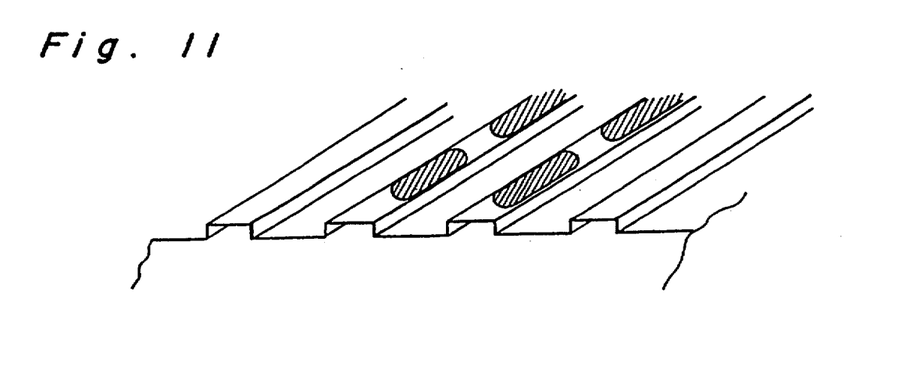
FIG. 11 is a perspective view of a portion of a disc substrate.

The guide tracks generally have a shape as shown in FIG. 10 of the accompanying drawings and are in the form of grooves of a depth generally equal to the wavelength λ divided by the product of the refractive index n times 8, i.e., λ/8n. Any of the information recording, reproduction and erasing is carried out while the light beam undergoes scanning guided along these guide grooves.

As a means ,for sensing a, tracking signal from the guide grooves, two methods are well-known; a Twin Spot method (a three-beam method) such as generally used in association with VD (video disc) and CD (compact disc), and a push-pull method such as generally used in association with an optically writeable disc. The Twin Spot method and the push-pull method are illustrated respectively in FIGS. 12 and 13 of the accompanying drawings.

Figure 12A:
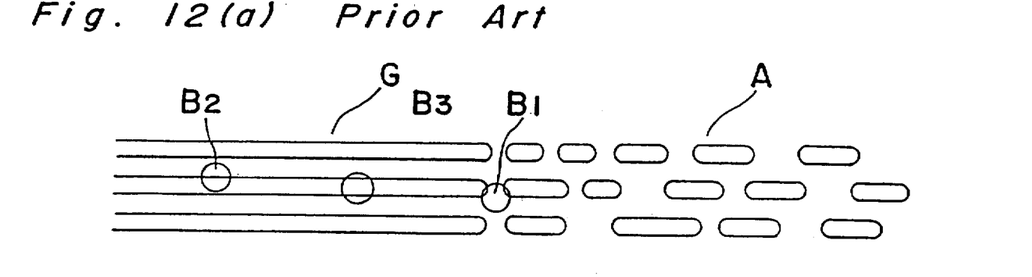
FIG. 12(a), 12(b) and 12(c) are a plan view of a portion of the disc substrate onto which the laser beams are projected.

The Twin Spot method has an advantage in that a stable tracking performance can be achieved even though a pick-up is inclined relative to the optical disc substrate. However, it has a problem in that, when a tracking beam scans a boundary between a guide groove region G and an address information region A constituted by a plurality of pits as shown in FIG. 12(a), the tracking tends to be disturbed because of the difference between a diffraction efficiency on the leading beam $B_1$ and that on the trailing beam $B_2$. It is to be noted that reference character R used in FIG. 12 (a) represents recorded bits.

Figure 12B:
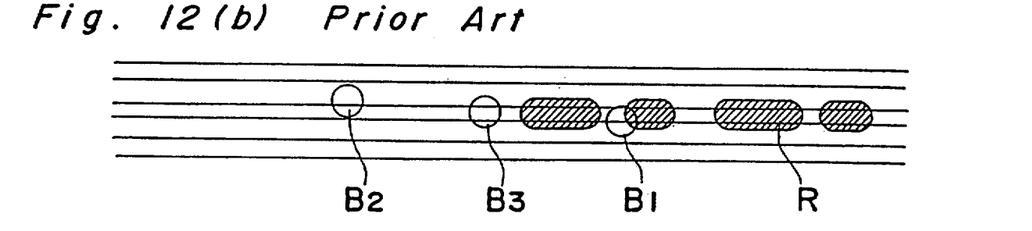
Figure 12C:
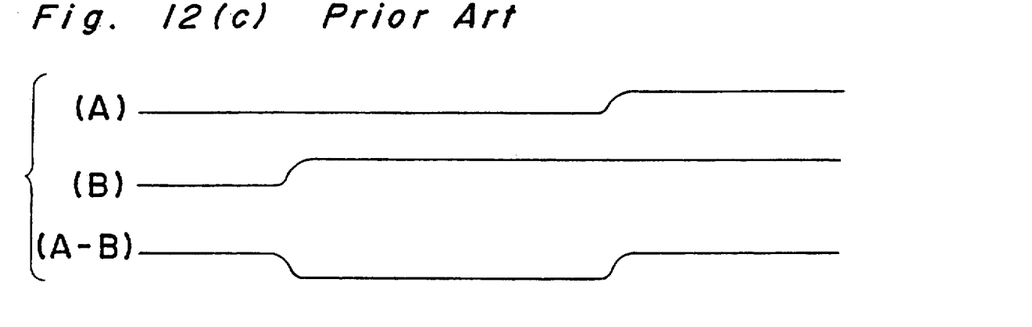
Figure 13A:
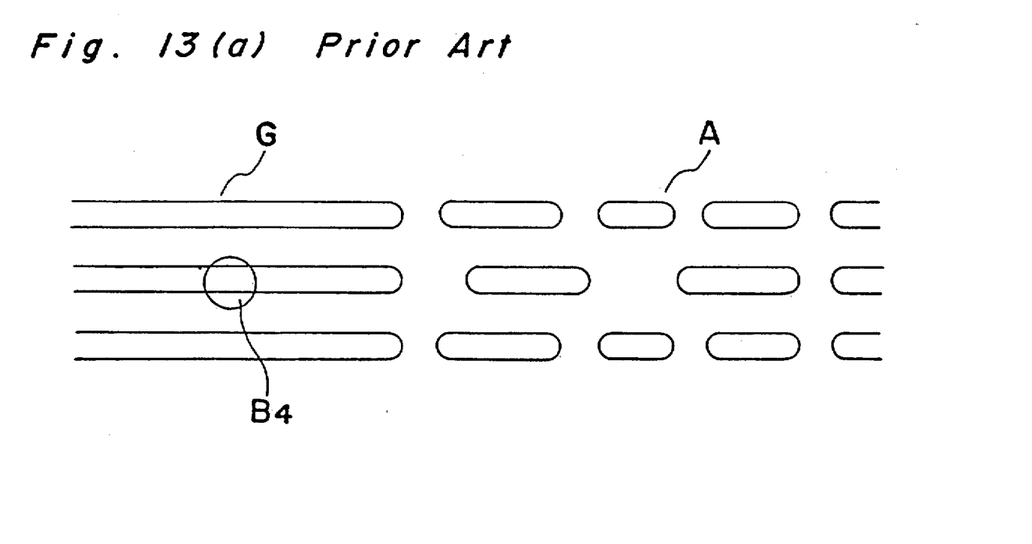
FIG. 13(a) is a plan view of a portion of the disc substrate onto which the laser beams are projected.
Figure 13B:
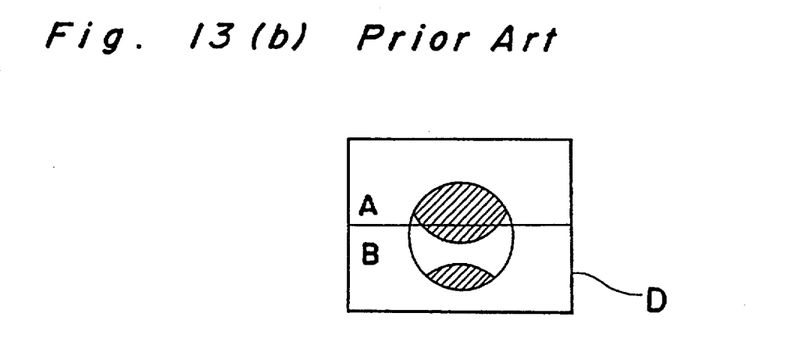
FIG. 13(b) is a schematic diagram showing the detector on which the beam spot is reflected.
Figure 13C:
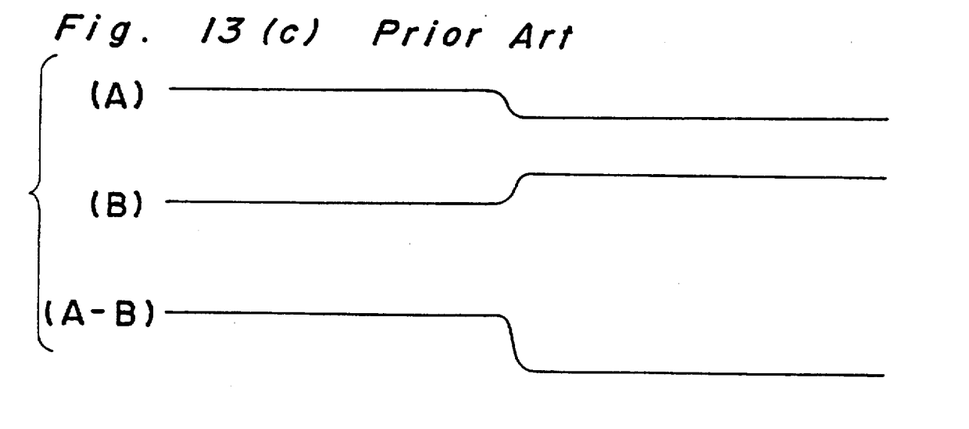
FIG. 13(c) is a diagram showing waveforms of the signals.

On the other hand, although the push-pull method is generally free from the above mentioned problem inherent in the Twin Spot method because of the tracking performed by a single beam $B_4$ as shown in FIG. 13(a), it has a problem in that, because the position of the light beam which has been reflected towards a detector D shown in FIG. 13 (b) tends to displace relative thereto in the event of occurrence of a shift in position of a lens as a result of the tracking or in the event of inclination of the pick-up relative to the disc, the tracking error signal tends to accompany a steady drift which will bring about a steady shift in tracking. Accordingly, in the event that the pick-up has inclined relative to the disc, the pattern of diffraction occurring at the guide groove region and that at the address information region differ from each other and, as a result thereof, the amount of tracking shift necessarily deviates to such an extent as to result in the disturbed tracking at the boundary. FIGS. 12 (a) to 12 (c) and FIGS. 13 (a) to 13 (c) are schematic representations illustrative of the change in tracking error signal occurring during the tracking at the boundary according to these two methods, respectively.

In these figures, the servo region is considered to be sufficiently lower than the pit reproducing frequency and, therefore, an output of the detector during the tracking at the address information region is shown as an average value. FIG. 12 applies where the difference in amount of beams reflected is taken as the tracking error signal, whereas FIG. 13 applies where the difference in output from detectors for detecting two split beam components is taken as the tracking error signal.

SUMMARY OF THE INVENTION

Accordingly, the present invention has been devised to substantially eliminating the above described problems and has for its essential object to provide a tracking system wherein a relatively easy signal processing means is employed to enable the tracking to be performed in a stabilized manner, even to discontinuous guide grooves, with no need to take special measures for any disc substrate.

BRIEF DESCRIPTION OF THE DRAWINGS

This and other objects and features of the present invention will become clear from the following description taken in conjunction with preferred embodiments thereof with reference to the accompanying drawings, in which:

FIG. 4 and 5 is a chart showing waveforms of signals appearing in the circuit of FIG. 3;

DETAILED DESCRIPTION OF THE EMBODIMENTS

Figure 1:
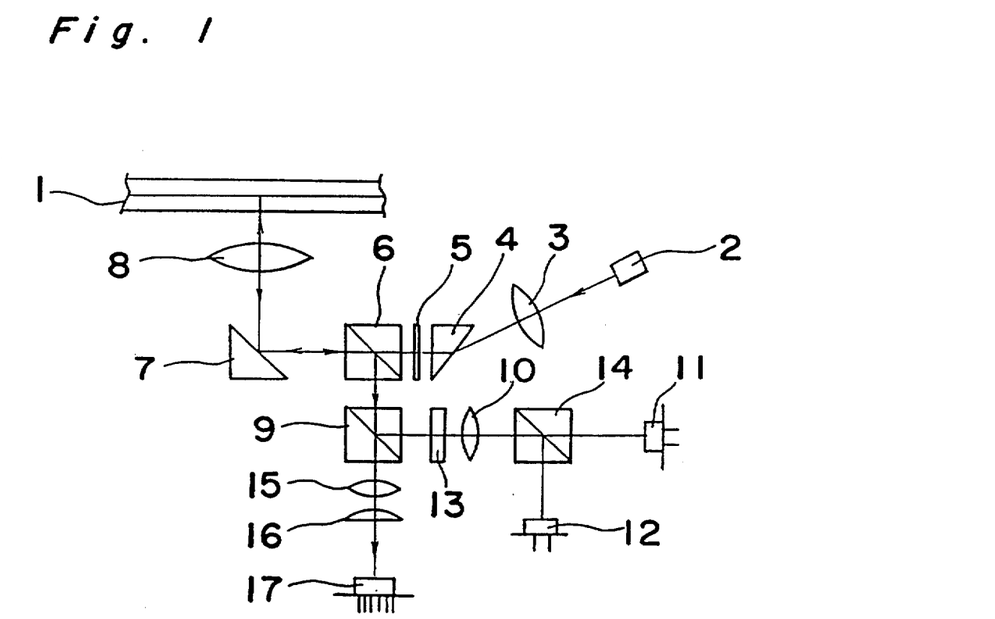
FIG. 1 is a schematic diagram showing an optical head for magneto optic disc according to one embodiment of the present invention.
Figure 2:
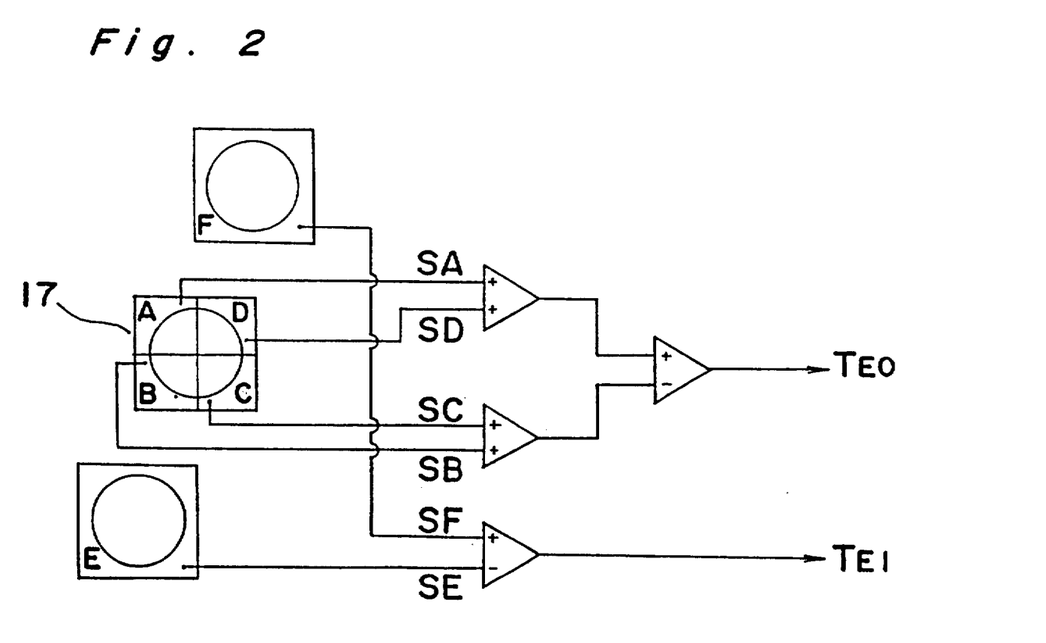
FIG. 2 is a diagram showing an electric circuit forming a detecting means for detecting a tracking error signal.

FIGS. 1 and 2 illustrate the structure of an optical head for magneto optic disc and a circuit forming a detecting means for detecting a tracking error signal outputted form the optical head, respectively.

Referring first to FIG. 1, reference numeral 1 represents a magneto optic disc comprising a disc substrate which has the previously discussed guide grooves and address information and is coated with a magnetizeable layer having an anisotropy of magnetism in a vertical direction. A laser beam produced from a semiconductor laser device 2 travels through a collimator lens 3 and then through a shaping prism 4 by which the cross-sectional representation of the laser beams which is elliptical is transformed into a generally circular shape. Reference numeral 5 represents a diffraction grating for splitting the laser beam by the utilization of a diffraction effect, the diffracted light of a spectral degree of 0 and ±1 being utilized. A polarizing beam splitter 6 is disposed between the diffraction grating 5 and an objective lens 8 for projecting a tiny spot of laser beam onto the magnetizeable layer on the magneto optic disc after having been deflected 90° by a total reflecting mirror 7. This polarizing beam splitter 6 serves to improve the polarization ratio of the incoming light and to further rotate the plane of polarization of the light, reflected from the disc, for generally increasing the angle of magneto optic rotation. This beam splitter 6 also serves to guide a portion of the laser beam toward photodetectors 11, 12 and 17 as will be described later.

The objective lens 8 referred to above is in practice driven by a servo control circuit (not shown) so that the size and position of the light spot projected onto the information tracks on the magnetizeable layer of the disc can be adjusted. Reference numeral 9 represents a polarizing beam splitter having, as is the case with the beam splitter 6, a function of increasing the angle of magneto optic rotation with respect to the reflected light. Reference numeral 10 represents a spot lens for projecting the information light, reflected from the beam splitter 9, onto the photo-detectors 11 and 12 in a predetermined spot size. A half wavelength plate 13 is positioned between the beam splitter 9 and the spot lens 10 for rotating the plane of the polarization of the information light in a direction intermediate between S-axis and P-axis of a polarizing beam splitter 14 which acts as an analyzer. Reference numeral 15 represents a spot lens, and reference numeral 16 represents a cylindrical lens so disposed as to have its focal line inclined 45° relative to the direction of connection of the guide grooves of the magneto optic disc 1.

Positioned on one side of the cylindrical lens 16 opposite to the spot lens 15 is the photo-detector of composite element type which includes six photo-detector elements A to F that are arranged in a pattern as shown in FIG. 2. By the cumulative effects of the spot lens 15 and the cylindrical lens 16, both the change in relative distance between the magnetizeable layer of the magneto optic disc 1 and the objective lens 8, and the deviation in a position between a condition of the light spot on the magnetizeable layer and the information track (guide grooves) can be detected. A method of detecting these servo signals is similar to that used in any one of the astigmatism method, the three-beam method and the push-pull method, all generally used in association with the optical disc.

FIG. 2 illustrates the relationship in position between the photo-detector 17 of composite element type and the reflected information light from the magneto optic disc 1, and also a detecting means. Based on respective outputs SA, SB, SC and SD of four light receiving elements A, B, C and D positioned centrally of the detecting means 17, a focusing error signal $F_E$ and a main in beam tracking error signal $T_{EO}$ can be obtained from the following equations.

$$F_E = (SA + SC) - (SB + SD)$$

$$T_{EO} = (SC + SD) - (SA + SB)$$

Also, based on respective outputs of light receiving elements E and F positioned on respective sides of the four light receiving elements A, B, C and D, a tracking error signal $T_{EI}$ resulting from two auxiliary beams can be obtained from the following equation.

$$T_{EI} = SF - SE$$

Of these error signals, the focusing error signal $F_E$ is used to control the drive of the objective lens 8 in a direction parallel to the optical axis which is effected by the servo control circuit and a drive device.

On the other hand, the main beam tracking error signal $T_{E0}$ and the tracking error signals $T_{E1}$ resulting from the two auxiliary beams are, after having been processed by some processes as will be described later, used to control the drive of the object lens 8 in a direction transverse to the track which is effected by the servo control circuit and the drive device.

Hereinafter, the processes necessary to effect the tracking by the use of the above-mentioned two tracking error signals will be described.

Figure 3:
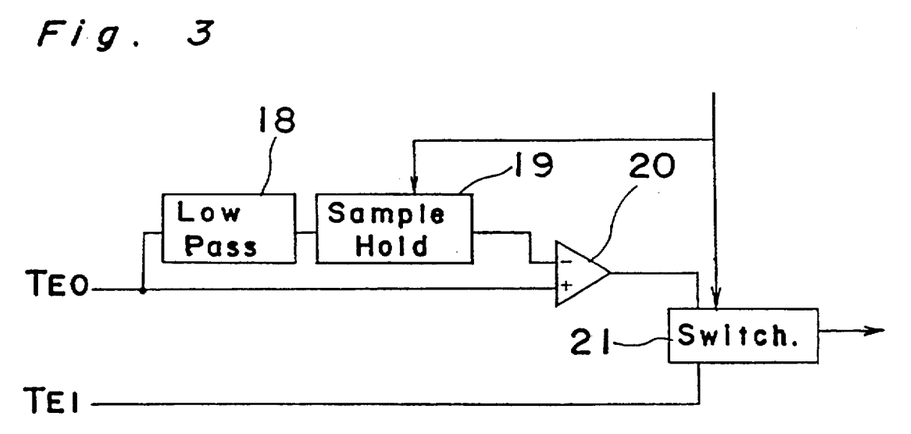
FIG. 3 is a circuit block diagram showing the circuit of the detecting means.
Figure 4:
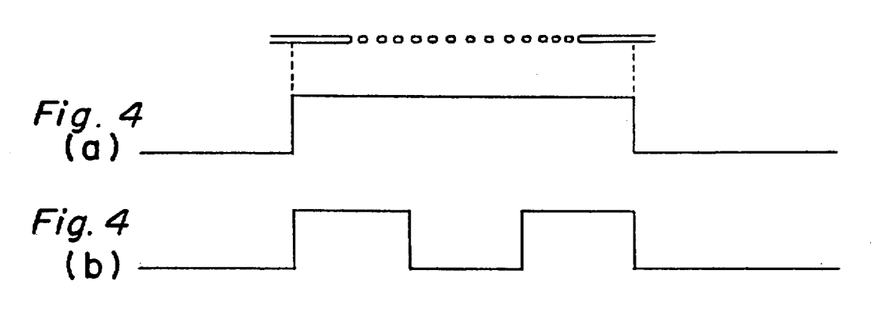

FIG. 3 is a circuit block diagram used to explain the first process. Reference numeral 18 represents a low pass filter unit for obtaining a low frequency component of the main beam tracking error signal $T_{E0}$. The low frequency component filtered through the low pass filter unit 18 is fed to a sample-and-hold circuit 19 for sampling and holding the output from the filter unit 18 in synchronism with a timing signal as will be described later. Reference numeral 20 represents a differential circuit for outputting a difference signal indicative of the difference between the output from the sample-and-hold circuit 19 and the maim beam tracking error signal $T_{E0}$, said difference signal being in turn fed to a (switching circuit 21) which is operable to effect a switching between the tracking error signal $T_{E1}$ and the tracking error signal processed as described above (i.e., output from the differential circuit 20) in synchronism with the timing signal. The switching operation of the switching circuit 21 is performed by the utilization of the timing signal, the waveform of which is shown by (a) in FIG. 4, in such a way that, at regions other than the address regions and the boundary regions, the tracking can be carried out according to the Twin Spot method (i.e., the signal $T_{E1}$) wherein the stable tracking error signal can be obtained, but at the address regions and the boundary regions, the amount of offset of the main beam tracking error signal $T_{E0}$ can be monitored during the tracking according to the Twin Spot method and the tracking can be carried out according to the push-pull method (i.e., the output of the differential circuit 20) by the main beam with this taken as a target value. Also, by the utilization of the timing signal shown by (b) in FIG. 4, the push-pull method (i.e., the output of the differential circuit 20) can be utilized for the tracking only at the boundary regions where the error signal (i.e., the signal $T_{E1}$) tends to be disturbed according to the Twin Spot method.

As the second process which can bring about a similar effect, a method can be contemplated wherein either the error signal associated with the auxiliary beams or the main beam tracking error signal is monitored while the tracking is normally carried out according to the Twin Spot method, but the tracking at the address regions and the boundary regions is carried out by holding the tracking error signal $T_{E1}$ according to the Twin Spot method or a low pass filter output signal of the push-pull signal $T_{E0}$ associated with the main beam. This process can work very well where the time required to pass the address regions is short and the amount of movement of tracks during this time is also small.

Although not discussed, care must be taken that the sensitivity of detection of various tracking error signals must be optically or electrically consistent and that any change in output incident to-change in power of the laser during the recording and the erasure must be controlled by any suitable method, for example, by the use of an automatic gain control circuit.

The tracking system according to the foregoing embodiment is advantageous in that, since the advantage of the Twin Spot method is utilized, the stable tracking can take place even with the optical disc having the address information partially preformatted.

The tracking system according to a different embodiment of the present invention will now be described with particular reference to FIGS. 5 to 8.

Figure 5:
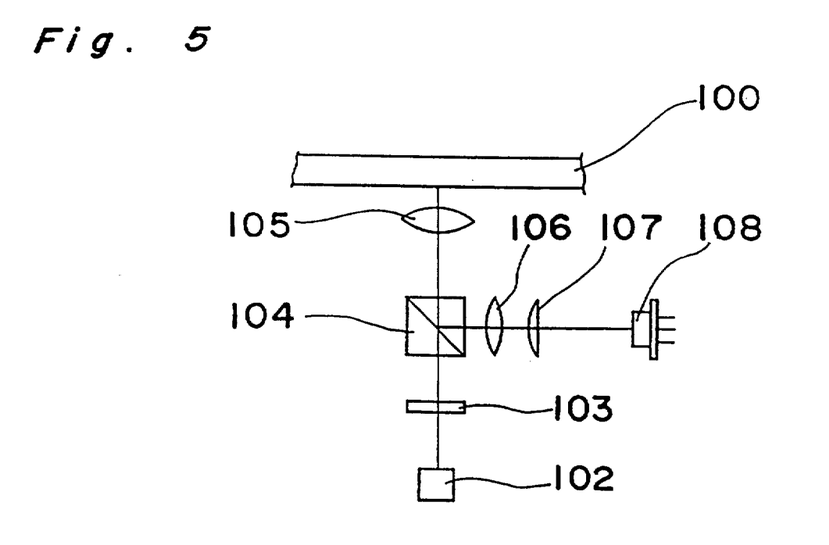
FIG. 5 is a schematic diagram showing an optical head for an optical disc to which a tracking system is applied according to a second embodiment of the present invention.

In FIG. 5, which illustrates the construction of an optical head for use with an optical disc to which the present invention has been applied, reference numeral 100 represents the optical disc having permanently formed therein non-continued guide grooves representative of the previously discussed guide grooves and address information. Reference numeral 102 represents a laser device for producing a predetermined laser beam. Reference numeral 103 represents a diffraction grating for producing a main beam used to carry out the recording, reproduction or erasing, as well as auxiliary beams used to obtain auxiliary tracking error signals, said grating having a direction of diffraction located on respective sides of a recording track. Reference numeral 104 represents a beam splitter operable to pass a portion of the incoming laser beam therethrough and also to guide the laser beam, which has been reflected from the optical disc 100, towards a photo-detector 108. That portion of the laser beam which has passed through the beam splitter 104 is formed by an objective lens 105 into a tiny spot of light which is projected onto the optical disc 100. This objective lens 105 can be controlled by a servo control circuit and a lens drive circuit, both not shown, so as to be moved in a direction parallel to the optical axis and also in a direction perpendicular to the tracks. In this way, the size and the position of the spot of the laser light projected onto the optical disc 100 can be adjusted.

The laser beam which has been reflected from the optical disc 100 and then guided by the beam splitter 104 travels towards the photo-detector 108 of composite element type through a spot lens 106 and then through a cylindrical lens 107 so positioned as to have its focal line inclined 45° relative to the direction of connection of the guide grooves of the optical disc 100. The relationship between the position of the spot of the laser beam projected onto the optical disc 1, the arrangement of detecting elements A to F of the photo-detector 8, and the position of the spot of the reflected light on each detecting element is shown in FIG. 6.

Figure 6:
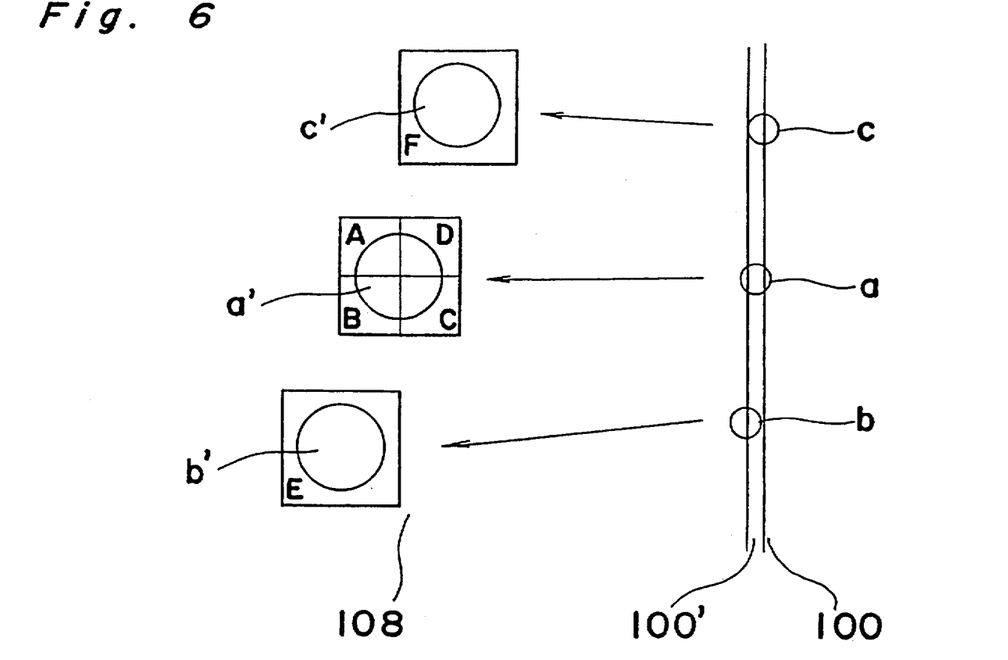
FIG. 6 is a schematic diagram showing a relationship between the respective positions of laser beam spots incident on the optical disc, the arrangement of detecting elements of a photo-detector and the respective positions of the laser beam spots reflected upon the 5 detecting elements.

Referring to FIG. 6, reference numeral 100' represents a recording track formed on the optical disc 1, reference character a represents the spot of the main beam of the incident laser projected on the recording track 100', and reference characters b and c represent respective spots of the auxiliary beams. Reference character a' represents a spot formed by a reflected light of the main beam, whereas reference characters b' and c' represent respective spots by reflected light of the auxiliary beams. In the construction shown therein, a focusing error signal $F_E$ necessary to move the objective lens 105 in the direction parallel to the optical axis, and tracking error signals $T_{E0}$ and $T_{E1}$ necessary to move the objective lens 105 in the direction perpendicular Go the tracks can be obtained according to the astigmatism system, the push-pull system and the three-beam system, respectively, and can be determined by performing calculation according to the following equations.

$$F_E = (SA+SC)-(SB+SD)$$

$$T_{E0} = (SA+SD)-(SC+SB)$$

$$T_{E1} = SF-SE$$

wherein SA, SB, SC, SD, SE and SF represent detection signals outputted from the detecting elements, respectively.

Figure 7:
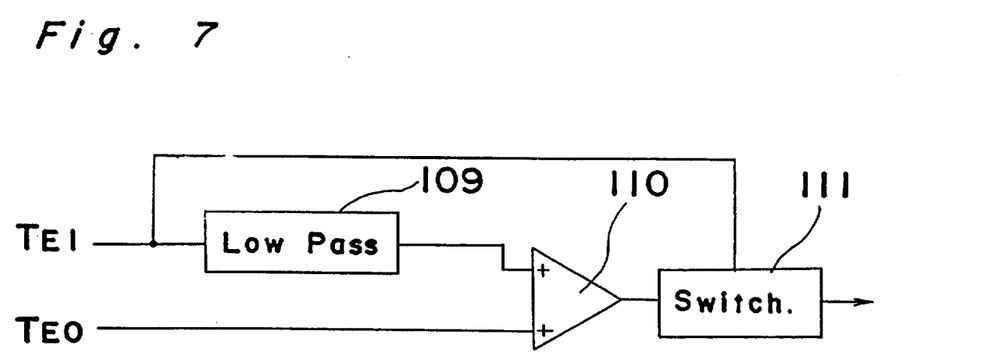
FIG. 7 is a circuit block diagram showing a circuit used to effect a processing necessary to produce a feedback control signal.
Figure 8A:
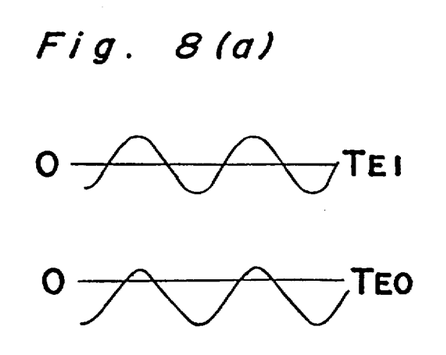
FIG. 8(a) and 8(b) are a chart showing waveforms of signals.
Figure 8B:
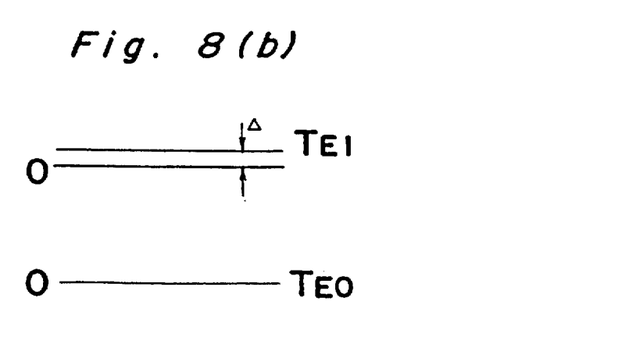

FIG. 7 illustrates a circuit block diagram showing a processing circuit for producing a feedback control signal on the basis of the tracking error signals $T_{E0}$ and $T_{E1}$ referred to above. Reference numeral 109 represents a low pass filter for extracting only a low frequency component of the tracking error signal $T_{E1}$ according to the Twin Spot method, and reference numeral 110 represents a differential circuit for performing addition or subtraction between the output of the low pass filter 109 and the tracking error signal $T_{E0}$ according to the push-pull system. Whether the differential circuit 110 performs addition or whether it performs subtraction depends on the relationship in phase between the error signals $T_{E1}$ and $T_{E0}$. By way of example, when the error signal $T_{E0}$ according to the push-pull system matches in phase with the error signal $T_{E1}$ according to the Twin Spot system as shown in FIG. 8 at the time an offset occurs in-the spot of the incident laser beam, an offset occurring in the error signal $T_{E0}$ can be compensated-for by adding the low frequency component, indicated by α in FIG. 8(b), of the error signal $T_{E1}$ produced incident to the tracking to the error signal $T_{E0}$, and therefore, the accurate tracking can be achieved as can be Understood from FIG. 8(b).

An output from the calculator 110 is fed to a switching circuit provided for enabling a stabilized withdrawal of the tracking, which circuit 111 can perform such a switching operation that the tracking error signal $T_{E1}$ according to the Twin Spot system can be utilized in the event that an steady offset occurring the error signal at the time of withdrawal from the track, but the tracking error signal which has been processed in the manner as hereinabove described can be utilized subsequent to the withdrawal.

The processing circuit described with reference to and shown in FIG. 7 can be modified as shown in FIG. 9 wherein like parts shown in FIG. 9 are designated by like reference numerals used in FIG. 7. Reference numerals 112 and 113 represent calculators, respectively, each of said calculators being similar to the calculator 110 shown in FIG. 7. This circuit shown in FIG. 9 is so designed that, where the error signal $T_{E0}$ according to the push-pull system and the error signal $T_{E0}$ according to the Twin Spot system can be obtained from a combination of the calculator 112 and the calculator 109 as shown in FIG. 10 (b), a difference signal S representative of the difference between the signal S' and the error signal $T_{E0}$ can be obtained from the calculator 113 as shown in FIG. 10(c). By the utilization of this difference signal S, the accurate tracking can be accomplished.

Thus, by the use of the foregoing technique according to the present invention, a tracking error signal for the tracking can be automatically corrected even though the offset occurs in the push-pull signal, and therefore, the stable tracking can be accomplished. In addition, since the reduced component of the tracking error signal according to the Twin Spot system is utilized, any external disturbance which would occur during the tracking at the boundary between the recorded or non-recorded area or the guide grooves and address region can be minimized to a negligible extent.

From the foregoing, it is clear that the present invention is effective to provide the tracking system which utilizes the advantages of both the Twin Spot system and the push-pull system. Moreover, even with the optical disc having the guide grooves and the address regions as well as the optical disc of a type which would result in change of the effectively, the tracking system of the present invention can ensure a sufficiently stabilized tracking performance.

Although the present invention has been fully described by way of example with reference to the accompanying drawings, it is to be noted here that various changes and modifications are apparent to those skilled in the art. Such changes and modifications are to be understood as included within the scope of the present invention, unless they depart therefrom.

What is claimed is:

1. A tracking system for an optical memory disc having a plurality of recording tracks thereon including track address regions and track information regions, comprising:

an optical head assembly including light beam producing means for producing a main light beam and two auxiliary light beams, said main and auxiliary light beams being scanned over said plurality of tracks;

detector means for detecting light beams reflected from said tracks as a result of the scanning and producing a first tracking error signal in response to the light reflected from said main beam and a second tracking error signal in response to the light reflected from said two auxiliary beams; and tracking control means for performing tracking control of said main beam on one of said tracks in response to a first difference signal equal to a difference between said first tracking error signal and a second difference signal, said second difference signal representative of a difference between said first and second tracking error signal.

2. The tracking system defined in claim 1, wherein said tracking control means comprises:

a first differential circuit providing said second difference signal;

a low pass filter for obtaining a low frequency component of said second difference signal; and a second differential circuit having inputs coupled to receive said first tracking error signal and said low frequency component and an output providing said first difference signal.

* * * * *